United States Patent
Haka

(10) Patent No.: US 7,128,682 B2
(45) Date of Patent: Oct. 31, 2006

(54) PLANETARY MANUAL TRANSMISSION

(75) Inventor: Raymond J. Haka, Brighton, MI (US)

(73) Assignee: General Motors Corporation, Detroit, MI (US)

( * ) Notice: Subject to any disclaimer, the term of this patent is extended or adjusted under 35 U.S.C. 154(b) by 175 days.

(21) Appl. No.: 10/976,054

(22) Filed: Oct. 28, 2004

(65) Prior Publication Data

US 2006/0094560 A1    May 4, 2006

(51) Int. Cl.
*F16H 3/62*    (2006.01)

(52) U.S. Cl. ...................... 475/275; 475/280

(58) Field of Classification Search ............... 475/275, 475/276, 277, 278, 279, 280
See application file for complete search history.

(56) References Cited

U.S. PATENT DOCUMENTS

| | | | | |
|---|---|---|---|---|
| 5,120,284 | A * | 6/1992 | Asada | 475/278 |
| 7,011,597 | B1 * | 3/2006 | Haka | 475/303 |
| 2004/0102279 | A1 * | 5/2004 | Lee et al. | 475/276 |
| 2005/0215387 | A1 * | 9/2005 | Haka | 475/303 |

* cited by examiner

*Primary Examiner*—Rodney H. Bonck
*Assistant Examiner*—Justin K. Holmes
(74) *Attorney, Agent, or Firm*—Christopher DeVries

(57) ABSTRACT

A mechanical clutch-controlled planetary transmission employs three planetary gearsets and seven synchronizer clutches to establish fifteen forward speed ratios and seven reverse speed ratios between a transmission input shaft and a transmission output shaft. Two of the planetary gearsets each provide three forward speed ratios including two underdrives and a direct drive, and a third of the planetary gearsets provides a reverse speed ratio, an underdrive speed ratio, a direct speed ratio, and an overdrive speed ratio.

4 Claims, 1 Drawing Sheet

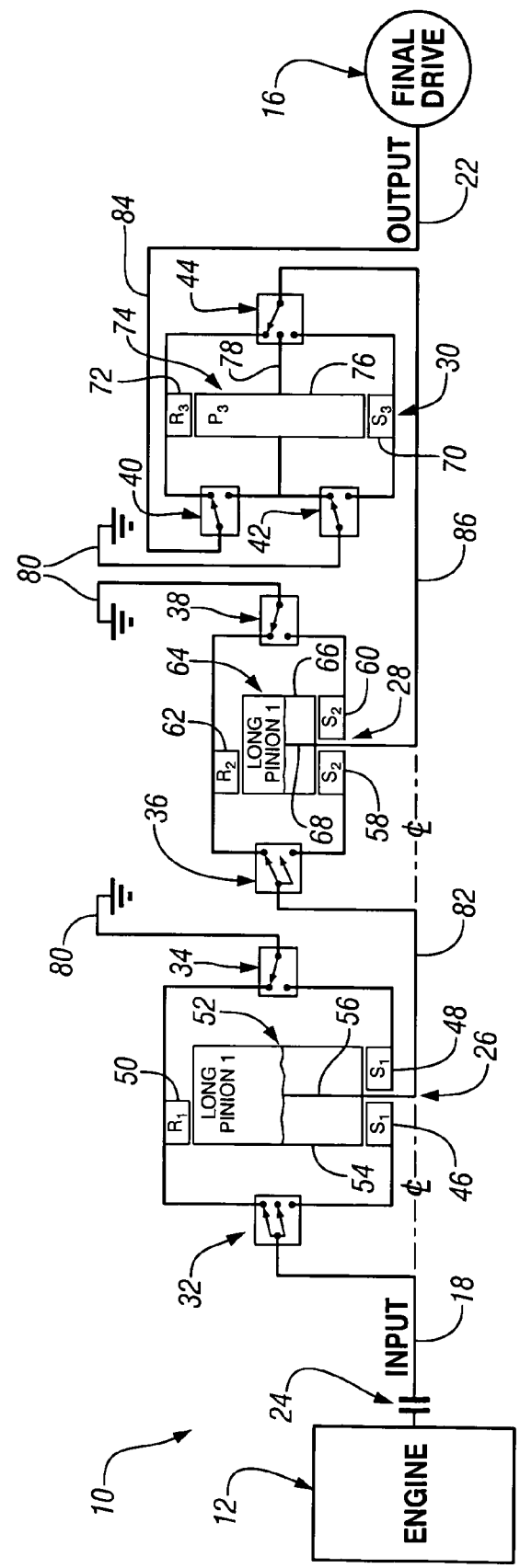

PLANETARY MANUAL TRANSMISSION

TECHNICAL FIELD

This invention relates to power transmissions and, more particularly, to planetary-type power transmissions employing mechanical clutch mechanisms.

BACKGROUND OF THE INVENTION

Power transmissions incorporating mechanical-type clutches, such as synchronizers, are well known to those skilled in the art of transmission operation and design. These transmissions are commonly termed "manual transmissions". The majority of manual transmissions employ a main shaft and one or more countershafts. Spur gears or helical gears are operatively associated with each of the main shaft and the countershafts and the gears on at least one of the shafts are fixed and the others are selectively connected with their respective shaft through a mechanical clutch, commonly termed "synchronizer".

These countershaft-type transmissions, as they are commonly termed, employ at least one gear mesh or gear pair for each forward speed ratio and a reverse idler in another gearset. The speed ratios between the transmission input shaft and output shaft are changed by manipulating the mechanical clutches while the engine is disengaged through a main clutch. More recently, it has been proposed to employ planetary-type gearing in manual-type transmissions.

SUMMARY OF THE INVENTION

It is an object of the present invention to provide an improved planetary manual-type transmission.

In one aspect of the present invention, the transmission employs three planetary gearsets coaxially aligned between an input shaft and an output shaft.

In another aspect of the present invention, the transmission utilizes seven mechanical-type clutches to control the speed ratios within the planetary gearsets.

In still another aspect of the present invention, two of the planetary gearsets each provide three forward speed ratios including a 1:1 or direct drive ratio.

In yet still another aspect of the present invention, the third of the planetary gearsets provides three forward speed ratios, including a direct drive, and one reverse speed ratio.

In a further aspect of the present invention, the three planetary gearsets combined will provide at least fifteen forward speed ratios and seven reverse speed ratios. This provides a wide spectrum of ratio coverage making the transmission very useful in larger vehicles, such as trucks and tractors.

DESCRIPTION OF THE DRAWINGS

The drawing is a schematic representation of a powertrain incorporating the present invention.

DESCRIPTION OF AN EXEMPLARY EMBODIMENT

As seen in the drawing, a powertrain 10 has an engine 12, a planetary transmission 14, and a conventional final drive mechanism 16. The engine 12 is a conventional prime mover, such an internal combustion engine. The final drive mechanism 16 is a conventional drive mechanism, such as a differential gear mechanism.

The planetary transmission 14 includes an input shaft 18, a planetary gear arrangement 20, and an output shaft 22. The input shaft 18 is selectively connectible with the engine 12 through a selectively engageable clutch mechanism 24. The clutch mechanism 24 is a conventional torque-transmitting mechanism, which might be either manually or automatically controlled through conventional control mechanisms. The planetary gear arrangement 20 includes three planetary gearsets 26, 28, and 30, and seven synchronizer clutches 32, 34, 36, 38, 40, 42, and 44.

The planetary gearset 26 includes two sun gear members 46 and 48, a ring gear member 50, and a planet carrier assembly member 52. The planet carrier assembly member 52 includes a plurality of pinion gears 54 rotatably mounted on a planet carrier member 56 and disposed in meshing relationship with both the sun gear members 46, 48, and the ring gear member 50. The sun gear members 46 and 48 are of the same diameter and have the same number of teeth and therefore rotate in unison with each other and with the pinion gears 54.

The planetary gearset 28 includes two sun gear members 58 and 60, a ring gear member 62, and a planet carrier assembly member 64. The planet carrier assembly member 64 includes a plurality of pinion gears 66 rotatably mounted on a planet carrier member 68 and disposed in meshing relationship with the ring gear member 62 and both of the sun gear members 58 and 60. The sun gear members 58 and 60 are of the same diameter and have the same number of teeth and therefore rotate in unison with each other and with the pinion gears 66.

The planetary gearset 30 includes a sun gear member 70, a ring gear member 72, and a planet carrier assembly member 74. The planet carrier assembly member 74 includes a plurality of pinion gears 76 rotatably disposed on a planet carrier member 78 and disposed in meshing relationship with both the sun gear member 70 and the ring gear member 72.

The synchronizer clutch 32 is a conventional synchronizer clutch, which connects the input shaft 18 with planetary members of the planetary gearset 26. The synchronizer clutch 32 is manipulable to connect the input shaft 18 with the ring gear member 50, with the sun gear member 46, and with both the sun gear member 46 and ring gear member 50. The synchronizer clutch 34 is a conventional two-way synchronizer, which is selectively operable to connect the ring gear member 50 with a stationary transmission housing 80 or to connect the sun gear member 48 with the stationary housing 80 or to disconnect both the ring gear member 50 or the sun gear member 48 from the stationary housing 80. The synchronizer clutch 36 is a conventional synchronizer clutch assembly, which is effective to connect a shaft 82 connected with the planet carrier member 56 to the ring gear member 62, the sun gear member 58, and both the ring gear member 62 and the sun gear member 58.

The synchronizer clutch 38 is a conventional two-way synchronizer, which is selectively operable to connect either the ring gear member 62 or the sun gear member 60 with the stationary transmission housing 80 or to disconnect both the ring gear member 62 or sun gear member 60 from the stationary housing 80. The synchronizer clutch 40 is a conventional two-way synchronizer clutch, which is selectively operable to connect either the ring gear member 72 or the planet carrier member 78 to a hub 84 with the output shaft 22. The synchronizer clutch 42 is selectively operable to connect either the planet carrier member 78 or the sun gear member 70 with the stationary housing 80 or disconnect both the carrier member 78 or sun gear member 70 from the stationary housing 80. The synchronizer clutch 44 is selectively operable in three conditions to selectively connect the ring gear member 72, the planet carrier member 78, or the sun gear member 70 with a shaft 86, which is continuously connected with the planet carrier member 68.

The synchronizer clutches 32 and 34 cooperate with the planetary gearset 26 to provide two underdrive speed ratios and one direct drive speed ratio. During the direct drive speed ratio, both the sun gear member 46 and the ring gear member 50 are connected with the input shaft 18 with synchronizer 34 in the neutral condition (i.e., not connecting either ring 50 or sun 48 to the housing 80), such that the planetary gearset 26 rotates in unison, thereby providing a direct drive through the shaft 82 and the synchronizer clutch 36. During the underdrive ratios, the sun gear member 48 is held stationary for one underdrive while the ring gear member 50 is connected with the input shaft 18, and the ring gear member 50 is held stationary while the sun gear member 46 is connected with the input shaft 18.

The synchronizer clutches 36 and 38 cooperate with the planetary gearset 28 to provide two underdrive forward speed ratios and one direct drive speed ratio. The direct drive speed ratio is provided when the synchronizer clutch 36 connects both the ring gear member 62 and the sun gear member 58 with the shaft 82, such that the planetary gearset 28 rotates as a single unit. During this condition, the synchronizer clutch 38 is in a neutral condition. One underdrive ratio is established when the synchronizer clutch 38 connects the ring gear member 62 with the transmission housing 80 and the synchronizer clutch 36 connects the sun gear member 58 with the shaft 82. The other underdrive ratio is established when the sun gear member 60 is connected with the transmission housing 80 through the synchronizer clutch 38 and the ring gear member 62 is connected with the shaft 82 through the synchronizer clutch 36.

The synchronizer clutches 40, 42, and 44 and the planetary gearset 30 cooperate to provide a reverse speed ratio and three forward speed ratios including an underdrive, a direct drive ratio, and an overdrive ratio. The reverse speed ratio is established when the planet carrier member 78 is connected with the transmission housing 80 through the synchronizer clutch 42, the sun gear member 70 is connected with the shaft 86 through the synchronizer clutch 44, and the ring gear member 72 is connected with the output shaft 22 through the synchronizer clutch 40 and hub 84. The underdrive ratio is established when the planet carrier member 78 is connected with the output shaft 22 through the synchronizer clutch 40, the ring gear member 72 is connected with the shaft 86, and the sun gear member 70 is connected with the transmission housing 80. The direct drive ratio is established when the synchronizer clutches 44 and 40 connect the shaft 86 with the output shaft 22. The overdrive ratio is established when the planet carrier member 78 is connected with the shaft 86 through the synchronizer clutch 44, the sun gear member 70 is connected with the transmission housing 80 through the synchronizer clutch 42, and the ring gear member 72 is connected with the output shaft 22 through the synchronizer clutch 40.

By manipulating the synchronizer clutches 32, 34, 36, 38, 40, 42, and 44, as shown in the following table, the transmission 14 will provide fifteen forward speed ratios and seven reverse speed ratios between the input shaft 18 and the output shaft 22. As seen in the table, during one of the forward speed ratios, the synchronizer clutches 34, 38, and 42 are in a neutral condition, that is, they do not have any torque capacity and do not affect the speed ratio.

During one reverse speed ratio and four forward speed ratios, two of the synchronizer clutches 34 and 38 are in a neutral condition. These combinations of neutral conditions among these synchronizers varies for the speed ratios to be established. These conditions occur at the extremely high reverse speed ratio, the seventh forward speed ratio, the tenth forward speed ratio, the thirteenth forward speed ratio, and the fourteenth forward speed ratio.

During the very high reverse speed ratio, the high reverse speed ratio, the reverse low speed ratio, and the reverse extremely low speed ratio, one of the synchronizer clutches 34 or 38 is in a neutral condition. Note that during all of these reverse speed ratios the synchronizer clutch 42 is connecting the planet carrier member 78 with the transmission housing 80, the synchronizer clutch 40 is connecting the ring gear member 72 with the output shaft 22, and the synchronizer clutch 44 is connecting the sun gear member 70 with the shaft 86.

During the second forward speed ratio, the fifth forward speed ratio, the sixth forward speed ratio, the ninth forward speed ratio, and the tenth forward speed ratio, one of the synchronizer clutches 34, 38, or 42 is in a neutral condition. During the reverse medium speed ratio, the reverse low speed ratio, the first speed ratio, the third speed ratio, the fourth speed ratio, the eighth speed ratio, and the eleventh forward speed ratio, all of the synchronizer clutches are active to participate in the speed ratios being established.

As shown in the chart, these combinations will provide at least seven reverse speed ratios and fifteen forward speed ratios. The step ratio between adjacent forward speed ratios is between 1.23 and 1.25. The step ratio between adjacent reverse speed ratios is between 0.65 and 0.81. The torque ratio (input torque/output torque) numerical values given in the table are established with the ring gear/sun gear tooth ratios also given in the table. The speed ratio (input speed/output speed) is the inverse of the torque ratio. As noted, the tooth ratios of the ring gear member 50 to the sun gear members 46 and 48 is 4.40, the tooth ratios of the ring gear member 62 to the sun gear members 58 and 60 is 1.89, and the tooth ratios of the ring gear member 72 to the sun gear member 70 is 4.40.

If it is desired to have different numerical values for speed ratios, these ring gear/sun gear tooth ratios can be adjusted accordingly. However, the speed ratios selected do provide substantially even step ratios between adjacent speeds, which is one of the values looked for in a multi-speed transmission. It is also possible to provide a sixteenth forward speed ratio when the planetary gearsets 26 and 28 are conditioned for a 1:1 drive and the planetary gearset 30 is conditioned for an overdrive. This condition might be of value if a transmission manufacturer wishes to employ some of the speed ratios that are available with the embodiment shown.

| Ratio | Torque Ratio | SYNCHRONIZER CLUTCH | | | | | | |
|---|---|---|---|---|---|---|---|---|
| | | 32 | 34 | 36 | 38 | 40 | 42 | 44 |
| Rev Ex Hi | −4.40 | S&R | 0 | S&R | 0 | R3 | C3 | S3 |
| Rev V Hi | −5.40 | R1 | S1 | S&R | 0 | R3 | C3 | S3 |
| Rev Hi | −6.73 | S&R | 0 | R2 | S2 | R3 | C3 | S3 |
| Rev Med | −8.257 | R1 | S1 | R2 | S2 | R3 | C3 | S3 |
| Rev Lo | −12.72 | S&R | 0 | S2 | R2 | R3 | C3 | S3 |
| Rev V Lo | −15.61 | R1 | S1 | S2 | R2 | R3 | C3 | S3 |
| Rev Ex Lo | −23.76 | S1 | R1 | S&R | 0 | R3 | C3 | S3 |

-continued

SYNCHRONIZER CLUTCH

| Ratio | Torque Ratio | 32 | 34 | 36 | 38 | 40 | 42 | 44 |
|---|---|---|---|---|---|---|---|---|
| 1 | 19.15 | S1 | R1 | S2 | R2 | C3 | S3 | R3 |
| 2 | 15.61 | S1 | R1 | S2 | R2 | R3 | 0 | R3 |
| 3 | 12.72 | S1 | R1 | S2 | R2 | R3 | S3 | C3 |
| 4 | 10.13 | S1 | R1 | R2 | S2 | C3 | S3 | R3 |
| 5 | 8.26 | S1 | R1 | R2 | S2 | R3 | 0 | R3 |
| 6 | 6.63 | S1 | R1 | S&R | 0 | C3 | S3 | R3 |
| 7 | 5.40 | S1 | R1 | S&R | 0 | R3 | 0 | R3 |
| 8 | 4.35 | R1 | S1 | S2 | R2 | C3 | S3 | R3 |
| 9 | 3.55 | S&R | 0 | S2 | R2 | C3 | S3 | R3 |
| 10 | 2.89 | S&R | 0 | S2 | R2 | R3 | 0 | R3 |
| 11 | 2.30 | R1 | S1 | R2 | S2 | C3 | S3 | R3 |
| 12 | 1.88 | R1 | S1 | R2 | S2 | R3 | 0 | R3 |
| 13 | 1.529 | S&R | 0 | R2 | S2 | R3 | 0 | R3 |
| 14 | 1.227 | R1 | S1 | S&R | 0 | R3 | 0 | R3 |
| 15 | 1.00 | S&R | 0 | S&R | 0 | R3 | 0 | R3 |

Ring gear 50/Sun gears 46, 48 = 4.40
Ring gear 62/Sun gears 58, 60 = 1.89
Ring gear 72/Sun gear 70 = 4.40

Obviously, many modifications and variations are possible in light within the above teaching, which will not deviate from the spirit and scope of the appended claims.

The invention claimed is:

1. A planetary transmission comprising:
an input shaft;
an output shaft;
a housing;
a first planetary gearset having a first member, a second member, a third member, and a fourth member, said first and fourth members being continuously interconnected to rotate in unison;
a second planetary gearset having a first member, a second member, a third member, and a fourth member, said first and fourth members being continuously interconnected to rotate in unison;
a third planetary gearset having a first member, a second member, and a third member;
a first mechanical clutch means for selectively interconnecting said input shaft with said first member or said second member, or both said first and said second members of said first planetary gearset;
a second mechanical clutch means for selectively interconnecting said housing with said fourth member or said second member of said first planetary gearset;
a third mechanical clutch means for selectively interconnecting said third member of said first planetary gearset with said first member or said second member of both said first member and said second member of said second planetary gearset;
a fourth mechanical clutch means for selectively connecting said housing with said second member or said fourth member of said second planetary gearset;
a fifth mechanical clutch means for selectively connecting said third member of said second planetary gearset with said first member, said second member, or said third member of said third planetary gearset;
a sixth mechanical clutch means for selectively connecting said first member or said third member of said third planetary gearset with said housing; and
a seventh mechanical clutch means for selectively connecting said second member or said third member of said third planetary gearset with said output shaft.

2. The planetary transmission defined in claim 1, further comprising:
said mechanical clutch means being engaged in combinations of four to establish one forward speed ratio, in combinations of five to establish one reverse speed ratio and four forward speed ratios, in combinations of six to establish four reverse speed ratios and five forward speed ratios, and in combinations of seven to establish two reverse speed ratios and five forward speed ratios through said planetary gearset between said input shaft and said output shaft.

3. The planetary transmission defined in claim 1, further comprising:
said first members of each of said planetary gearsets being a sun gear member, said second members of each of said planetary gearsets being a ring gear member, and said third members of each of said planetary gearsets being a planet carrier member.

4. The planetary transmission defined in claim 3, further comprising:
said fourth member of both of said first and second planetary gearsets being sun gear members.

* * * * *